United States Patent
Panchal et al.

(10) Patent No.: US 9,894,190 B2
(45) Date of Patent: Feb. 13, 2018

(54) ACTIVATING CARRIER AGGREGATION BASED ON APPLICATION LAYER INFORMATION

(71) Applicant: Verizon Patent and Licensing Inc., Arlington, VA (US)

(72) Inventors: Jignesh S. Panchal, Hillsborough, NJ (US); Rakesh Chandwani, Morganville, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 212 days.

(21) Appl. No.: 14/859,760

(22) Filed: Sep. 21, 2015

(65) Prior Publication Data

US 2017/0086209 A1    Mar. 23, 2017

(51) Int. Cl.
*H04W 4/00* (2009.01)
*H04L 29/08* (2006.01)

(52) U.S. Cl.
CPC ............. *H04L 69/329* (2013.01); *H04W 4/00* (2013.01)

(58) Field of Classification Search
None
See application file for complete search history.

(56) References Cited

U.S. PATENT DOCUMENTS

| | | | |
|---|---|---|---|
| 2011/0250874 A1* | 10/2011 | Shah ................. | H04M 3/42042 455/415 |
| 2013/0016690 A1* | 1/2013 | Jeong .................... | H04W 24/10 370/329 |
| 2014/0170990 A1* | 6/2014 | Black ..................... | H04B 1/401 455/73 |

* cited by examiner

*Primary Examiner* — Alex Skripnikov

(57) ABSTRACT

A device may identify application layer information for content to be provided to a user device. The device may determine, for the user device, a priority for activating carrier aggregation based on the application layer information. The device may activate carrier aggregation for the user device based on the priority for activating carrier aggregation. The device may provide the content to the user device using carrier aggregation based on activating carrier aggregation for the user device.

20 Claims, 7 Drawing Sheets

ACTIVATING CARRIER AGGREGATION BASED ON APPLICATION LAYER INFORMATION

BACKGROUND

Carrier aggregation may include aggregating a carrier (e.g., adding a component carrier) to a carrier already in use to increase a bandwidth and a bit rate between a user device and a network provider. The component carrier may include an additional frequency range which the network provider can use to transmit data and increase the bandwidth. The component carrier may be contiguous with the carrier already in use (e.g., in a contiguous frequency band), or non-contiguous with the carrier already in use. Carrier aggregation may be used to increase the bit rate when there is a backlog of data.

DETAILED DESCRIPTION OF PREFERRED EMBODIMENTS

The following detailed description of example implementations refers to the accompanying drawings. The same reference numbers in different drawings may identify the same or similar elements.

Carrier aggregation may include using multiple carriers, rather than a single carrier, to increase a bandwidth and a bit rate between a user device and a network provider. Carrier aggregation may include Licensed Assisted Access (LAA) carrier aggregation, Long Term Evolution Unlicensed (LTE-U) carrier aggregation, and Licensed LTE carrier aggregation. Carrier aggregation may be used to increase the bit rate when there is a backlog of data. However, there is currently no consideration of application layer information, that is associated with content that a user device is requesting or receiving, when prioritizing carrier aggregation activation (e.g., use of carrier aggregation to add carriers).

Application layer information may be based on information from an application layer (e.g., the application layer of the open systems interconnection (OSI) model). Application layer information may identify a delivery type for content (e.g., whether content is streaming content or non-streaming content), a file type associated with the content, an application or an application type being used to receive the content, information that identifies a protocol used to request or receive the content (e.g., a protocol identifier), information that identifies a source of the content (e.g., a source identifier), information that identifies whether the content is associated with a subscription service (e.g., a service identifier), and/or the like. Application layer information may provide an indication of whether the content is time sensitive, requires additional bandwidth to send, and/or is a good candidate for activation of carrier aggregation. Additionally, or alternatively, application layer information may include a recommendation (e.g., a request) for activating carrier aggregation based on an analysis of other parts of the application layer information. Implementations described herein may identify and use application layer information when prioritizing activation of carrier aggregation, so that carrier aggregation is activated for user devices requesting or receiving content that is of a higher priority (e.g., because the content is time sensitive, because the content is of a certain type, etc.) based on the application layer information.

Figure 1A:
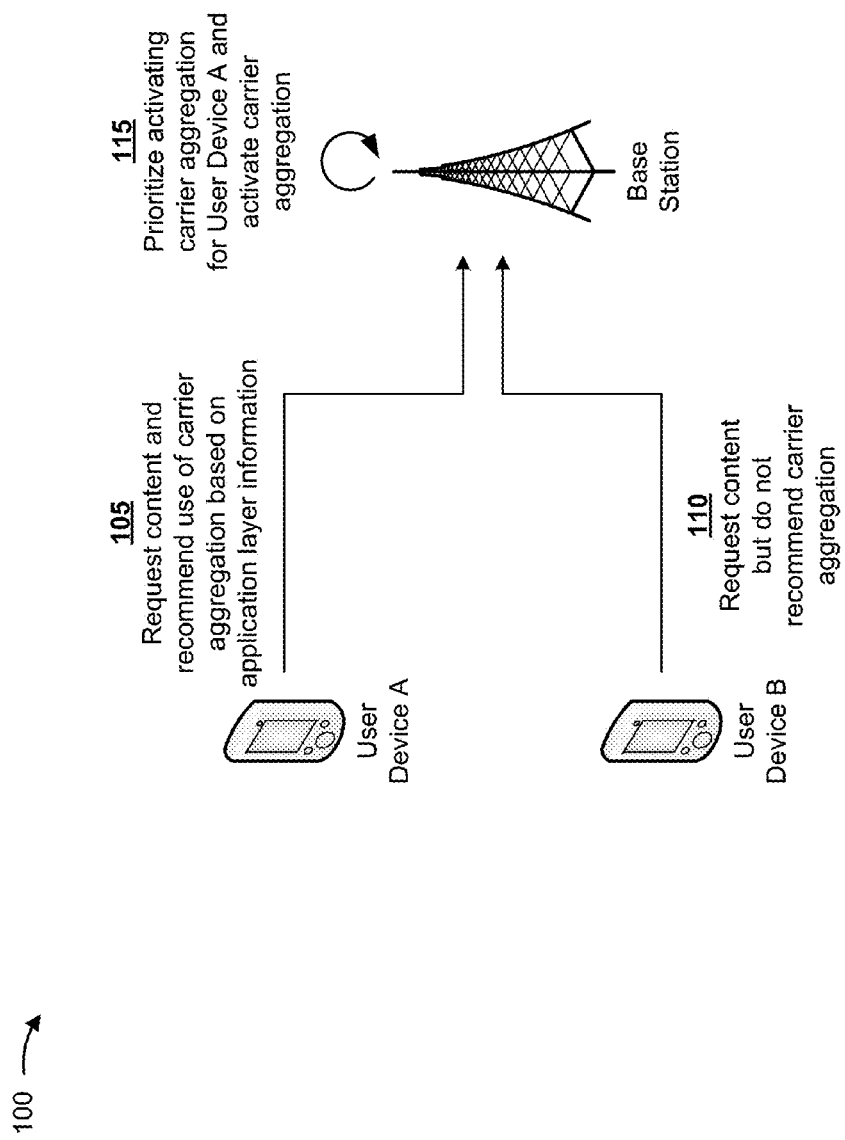
FIGS. 1A-1C are diagrams of an overview of example implementations described herein.

FIG. 1A is a diagram of an overview of an example implementation 100 described herein. As shown in FIG. 1A, and by reference number 105, assume that User Device A is requesting content via a base station. User Device A uses application layer information (e.g., information associated with an application that is requesting the content, a file type of the content, or the like) to determine that User Device A is a good candidate for activation of carrier aggregation based on the content that User Device A is requesting (e.g., the content is time sensitive, requires additional bandwidth to send, etc.). User Device A sends a recommendation (e.g., a request) for use of carrier aggregation based on the application layer information. The recommendation may be included in the application layer information.

As shown by reference number 110, assume that User Device B is requesting content, via the base station, but is not recommending carrier aggregation. As shown by reference number 115, the base station prioritizes activation of carrier aggregation for User Device A based on the recommendation from User Device A. The base station activates carrier aggregation for User Device A when possible. For example, the base station may activate carrier aggregation based on a queue, in which an identifier for User Device A may be placed, associated with activating carrier aggregation. The base station may activate carrier aggregation for User Device A when a carrier is available based on a placement of the identifier for User Device A in the queue, and may provide the content using carrier aggregation. The base station may send the content using carrier aggregation, once carrier aggregation is activated. The base station does not prioritize carrier aggregation for User Device B based on User Device B not recommending carrier aggregation.

Figure 1B:
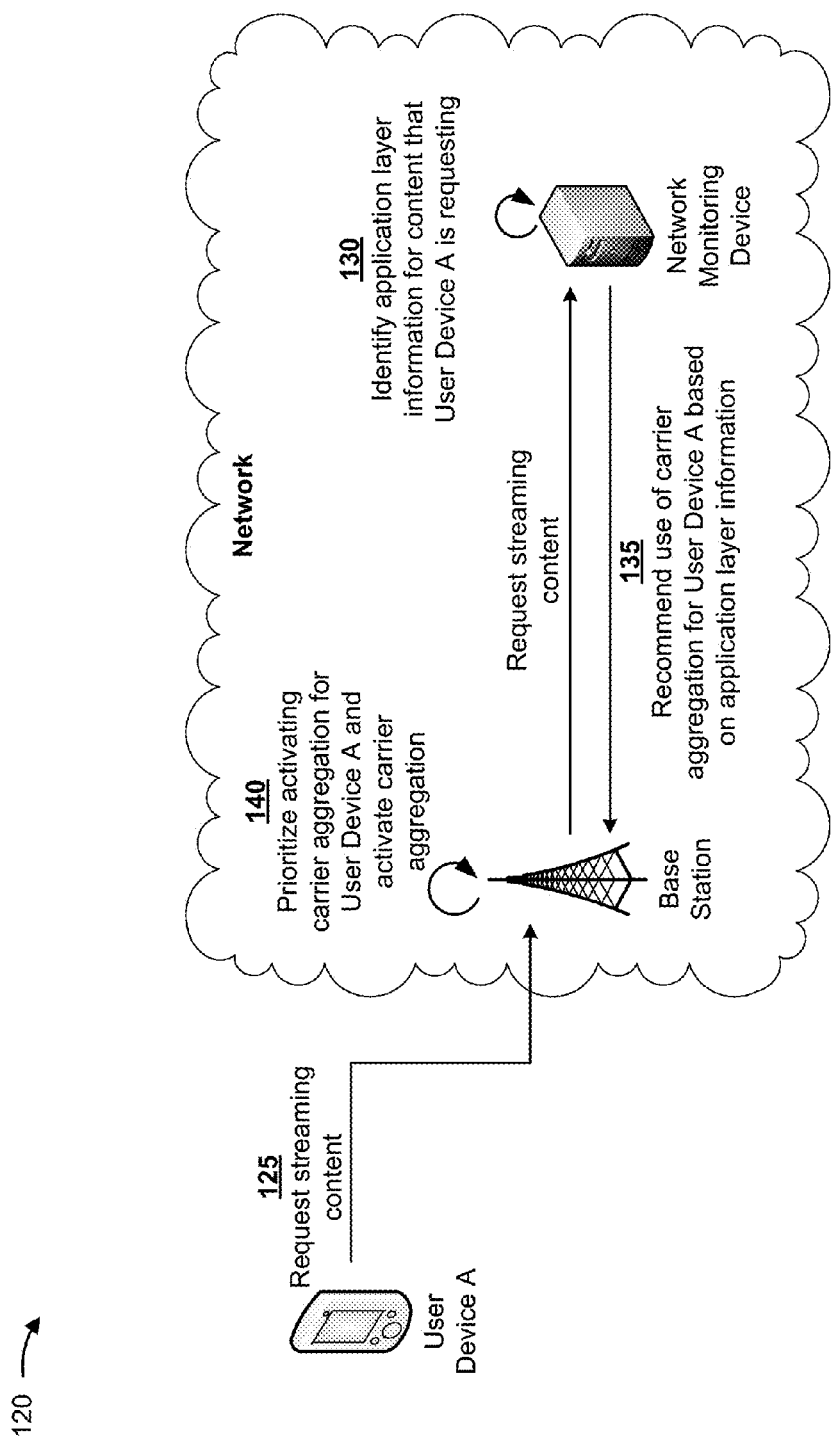

FIG. 1B is a diagram of another overview of another example implementation 120 described herein. As shown by reference number 125, assume that User Device A is requesting streaming content via a base station. The base station forwards, to a network monitoring device, the request for the streaming content by User Device A. As shown by reference number 130, the network monitoring device identifies application layer information for content that User Device A is requesting (e.g., that the content is streaming content rather than non-streaming content). As shown by reference number 135, the network monitoring device recommends use of carrier aggregation for User Device A based on the application layer information. The recommendation may be included in the application layer information. As shown by reference number 140, the base station prioritizes activation of carrier aggregation for User Device A based on the recommendation from the network monitoring device. The base station activates carrier aggregation for User Device A when possible and provides the content using carrier aggregation as described in connection with FIG. 1A.

Figure 1C:
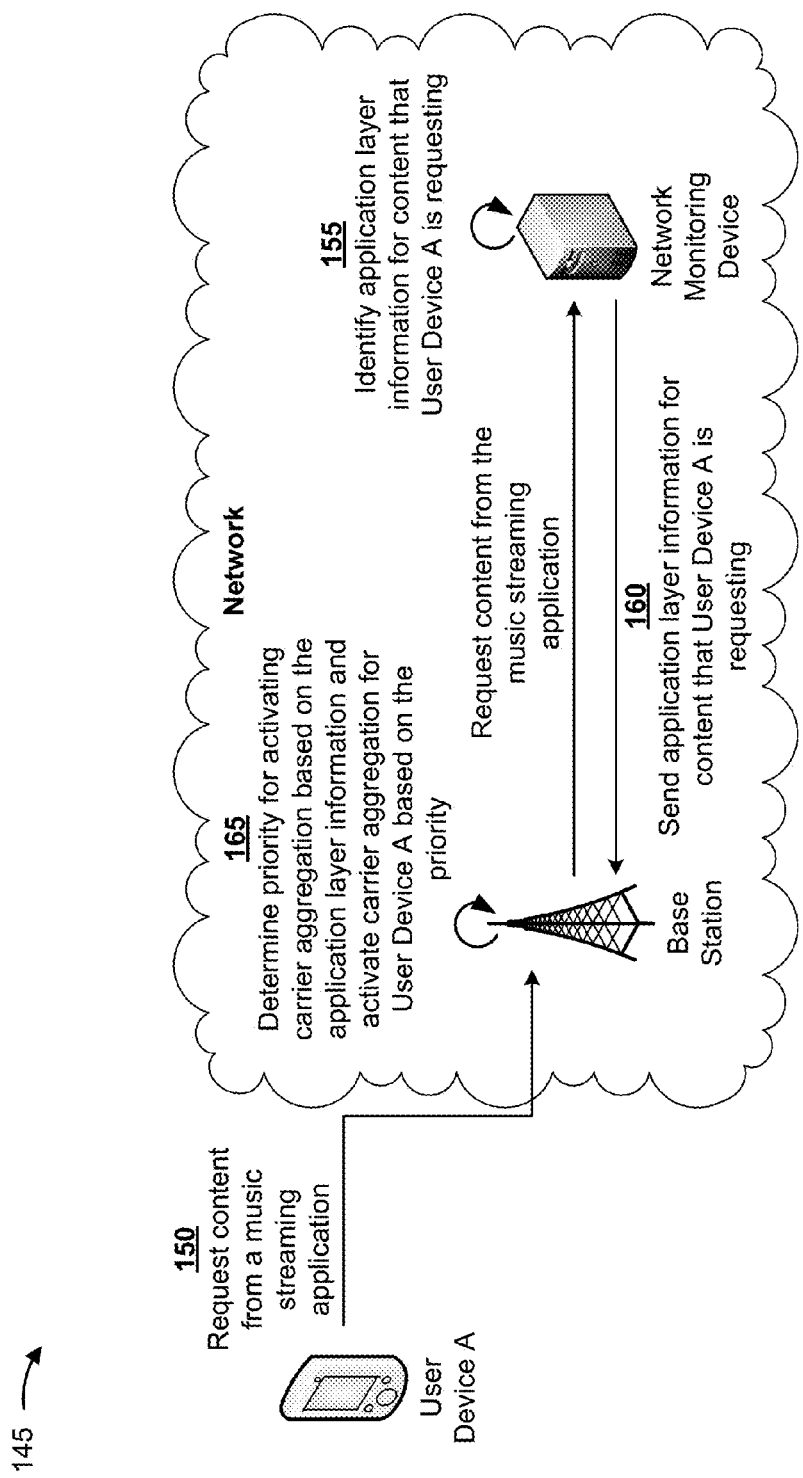

FIG. 1C is a diagram of another overview of another example implementation 145 described herein. As shown by reference number 150, assume that User Device A is requesting, via a base station, content from a music streaming application. The base station forwards, to a network monitoring device, the request for content, by User Device A, from the music streaming application. As shown by reference number 155, the network monitoring device identifies application layer information for content that User Device A is requesting (e.g., that the content is being requested using the music streaming application). As shown by reference number 160, the network monitoring device sends, to the base station, the application layer information for content that User Device A is requesting.

As shown by reference number 165, the base station determines a priority for activating carrier aggregation based on the application later information. In the provided example, given that the content is from a music streaming application, the base station determines that activating carrier aggregation for User Device A is a high priority. The base station activates carrier aggregation, for User Device A, when possible (e.g., as described in connection with FIG. 1A) and provides the content to User Device A using carrier aggregation based on determining that User Device A is a high priority for activating carrier aggregation.

Implementations described herein may determine and use application layer information, associated with content that is requested by a user device, to determine whether to activate carrier aggregation for the user device. The application layer information may include information associated with an application used to request and/or receive the content, information that identifies a file type associated with the content, a delivery type for the content (e.g., whether the content is streaming content or non-streaming content), an application type associated with the content, a protocol identifier associated with the content, a source identifier, a recommendation for activating carrier aggregation (e.g., or a classification related to activating carrier aggregation, such as "high priority") based on the application layer information, a service identifier associated with the content, and/or the like, as described in detail below.

The base station may use the application layer information when determining, for the user device, a priority for activating carrier aggregation prior to activating carrier aggregation for the user device. By activating carrier aggregation based on application layer information, a network provider provides a better experience to users, associated with the user devices of a network, by activating carrier aggregation for user devices that could use more bandwidth based on the application layer information (e.g., such as the application). Furthermore, the network provider is able to save network resources when more bandwidth is not needed based on the application layer information and can reduce costs associated with using carrier aggregation.

Figure 2:
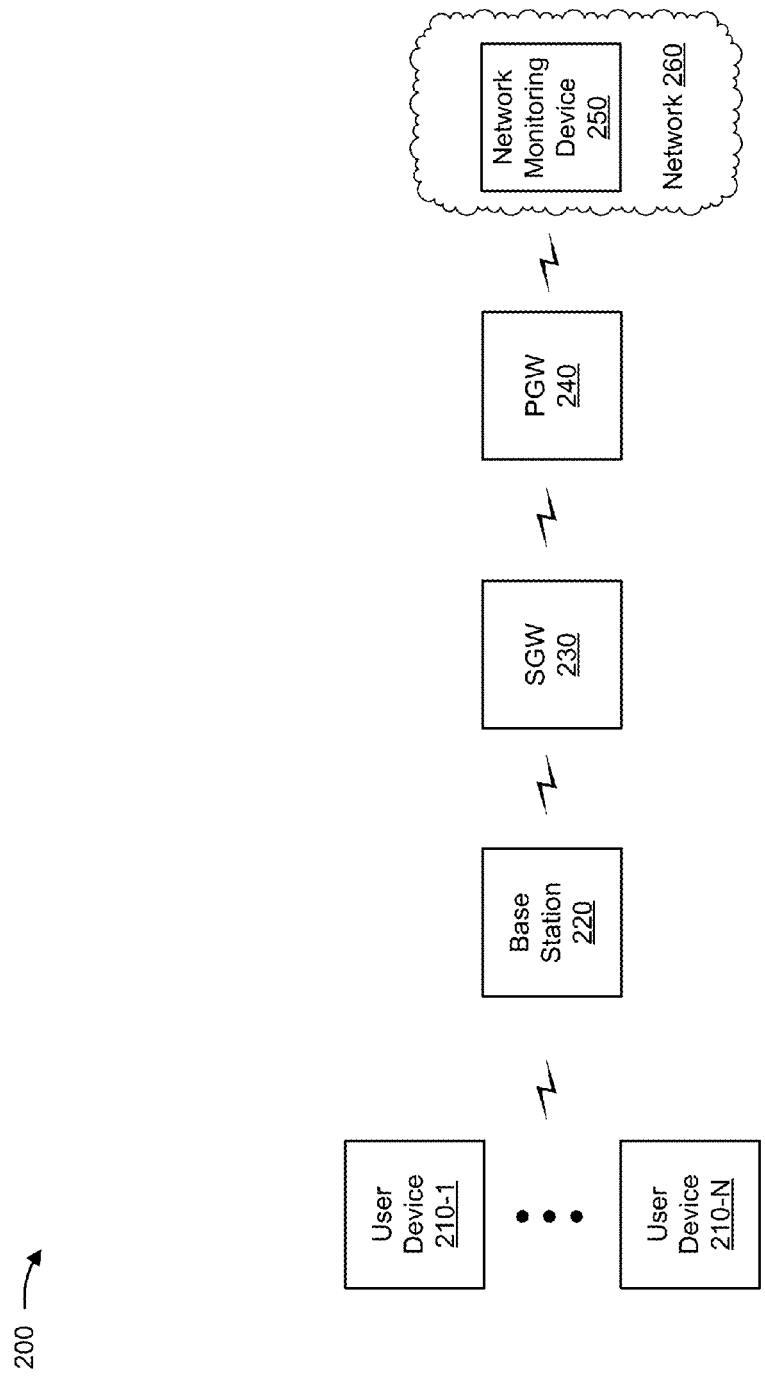
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include one or more user devices 210-1 through 210-N(N≥1) (hereinafter referred to collectively as "user devices 210," and individually as "user device 210"), a base station 220, a serving gateway (SGW) 230, a packet data network gateway (PGW) 240, a network monitoring device 250, and a network 260. Devices of environment 200 may interconnect via wired connections, wireless connections, or a combination of wired and wireless connections.

User device 210 may include one or more devices capable of communicating with base station 220 and/or a network (e.g., network 260). For example, user device 210 may include a wireless communication device, a radiotelephone, a personal communications system (PCS) terminal (e.g., that may combine a cellular radiotelephone with data processing and data communications capabilities), a smart phone, a laptop computer, a tablet computer, a personal gaming system, and/or a similar device. User device 210 may send traffic to and/or receive traffic from network 260 (e.g., via base station 220, SGW 230, and/or PGW 240).

Base station 220 may include one or more devices capable of transferring traffic, such as audio, video, text, and/or other traffic, destined for and/or received from user device 210. In some implementations, base station 220 may include an Evolved Node B (eNB) associated with the Long Term Evolution (LTE) network that receives traffic from and/or sends traffic to network 260 via SGW 230 and/or PGW 240. Additionally, or alternatively, one or more base stations 220 may be associated with a radio access network (RAN) that is not associated with the LTE network. Base station 220 may send traffic to and/or receive traffic from user device 210 via an air interface. In some implementations, base station 220 may include a small cell base station, such as a base station of a microcell, a picocell, and/or a femtocell.

SGW 230 may include one or more devices capable of routing packets. For example, SGW 230 may include one or more data processing and/or traffic transfer devices, such as a gateway, a router, a modem, a switch, a firewall, a network interface card (NIC), a hub, a bridge, a server device, an optical add/drop multiplexer (OADM), or any other type of device that processes and/or transfers traffic. In some implementations, SGW 230 may aggregate traffic received from one or more base stations 220 associated with the LTE network, and may send the aggregated traffic to network 260 (e.g., via PGW 240) and/or other network devices associated with an evolved packet core (EPC) and/or an IP Multimedia Subsystem (IMS) core. SGW 230 may also receive traffic from network 260 and/or other network devices, and may send the received traffic to user device 210 via base station 220. Additionally, or alternatively, SGW 230 may perform operations associated with handing off user device 210 to and/or from an LTE network.

PGW 240 may include one or more devices capable of providing connectivity for user device 210 to external packet data networks (e.g., other than the EPC and/or LTE network). For example, PGW 240 may include one or more data processing and/or traffic transfer devices, such as a gateway, a router, a modem, a switch, a firewall, a NIC, a hub, a bridge, a server device, an OADM, or any other type of device that processes and/or transfers traffic. In some implementations, PGW 240 may aggregate traffic received from one or more SGWs 230, and may send the aggregated traffic to network 260. Additionally, or alternatively, PGW 240 may receive traffic from network 260, and may send the traffic to user device 210 via SGW 230 and base station 220. PGW 240 may record data usage information (e.g., byte usage).

Network monitoring device 250 may include one or more devices (e.g., one or more traffic transfer devices) capable of processing and/or transferring traffic between devices. For example, network monitoring device 250 may include a firewall, a router, a gateway, a switch, a hub, a bridge, a reverse proxy, a server (e.g., a proxy server), a security device, an intrusion detection device, a load balancer, or a similar device.

Network 260 may include one or more wired and/or wireless networks. For example, network 260 may include a cellular network (e.g., an LTE network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
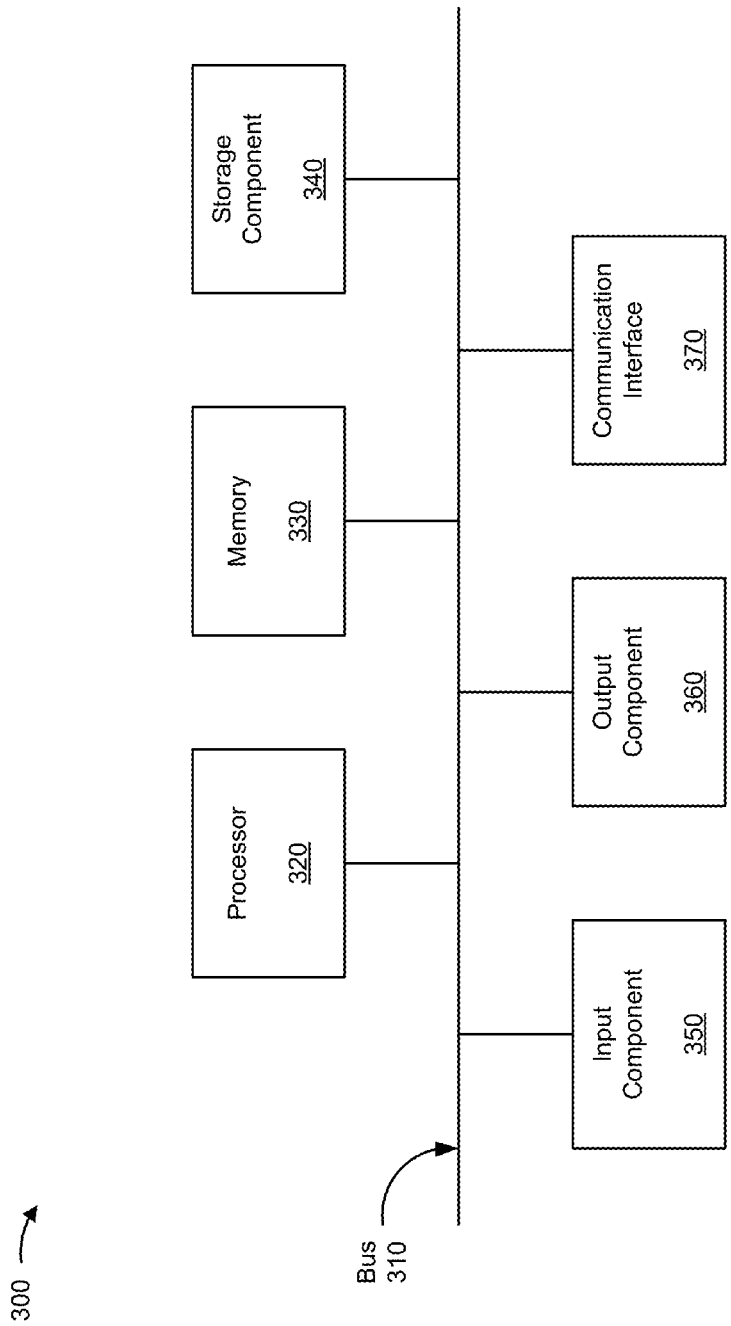
FIG. 3 is a diagram of example components of one or more devices of FIG. 2.

FIG. 3 is a diagram of example components of a device 300. Device 300 may correspond to user device 210, base station 220, SGW 230, PGW 240, and/or network monitoring device 250. In some implementations, user device 210, base station 220, SGW 230, PGW 240, and/or network monitoring device 250 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. In some implementations, processor 320 may include one or more processors capable of being programmed to perform a function. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
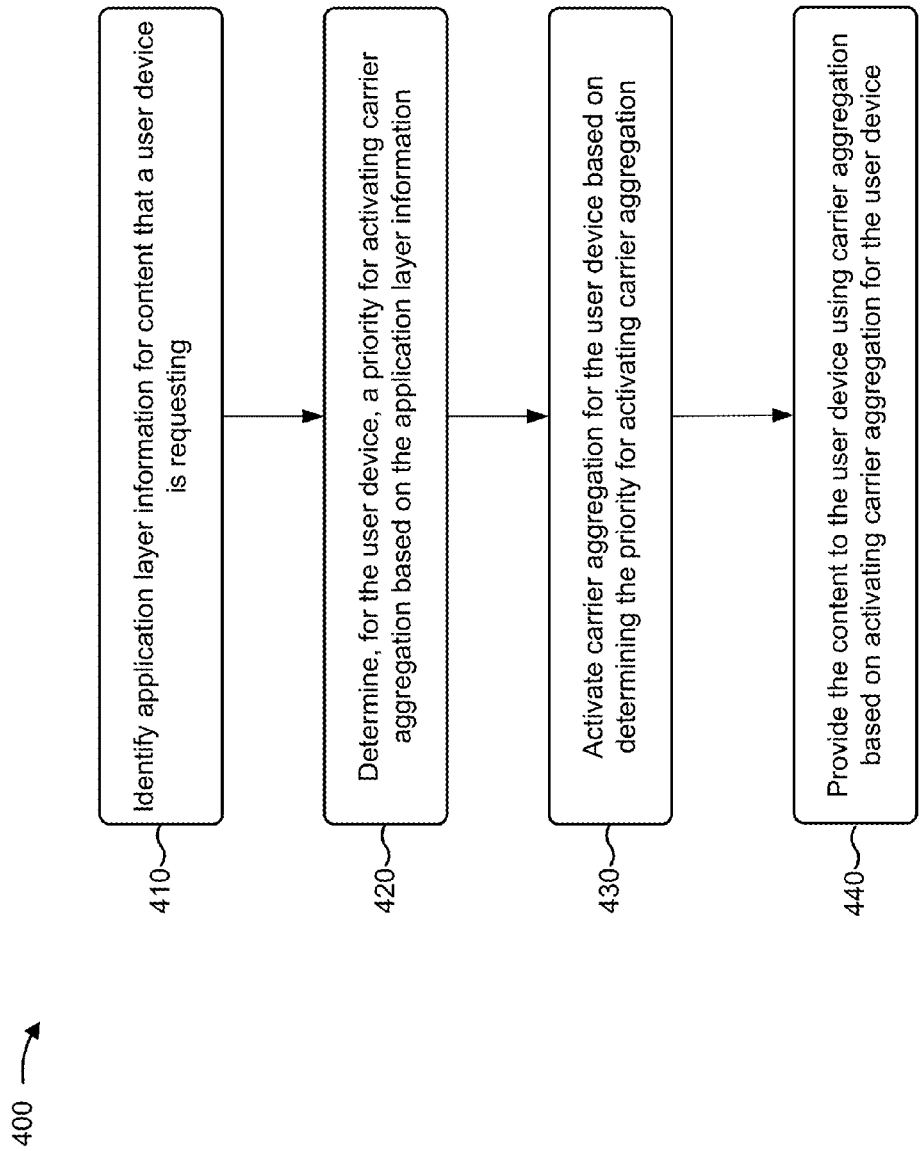
FIG. 4 is a flow chart of an example process for activating carrier aggregation based on application layer information.

FIG. 4 is a flow chart of an example process 400 for activating carrier aggregation based on application layer information. In some implementations, one or more process blocks of FIG. 4 may be performed by base station 220. In some implementations, one or more process blocks of FIG. 4 may be performed by another device or a group of devices separate from or including base station 220, such as user device 210, SGW 230, PGW 240, and/or network monitoring device 250.

As shown in FIG. 4, process 400 may include identifying application layer information for content that a user device is requesting (block 410). For example, base station 220 may identify application layer information associated with content requested by a user device 210. Application layer information may include information obtained from or based on information from an application layer (e.g., the application layer of an Open Systems Interconnection (OSI) Model). For example, the application layer information may be associated with an application used by user device 210 to request and/or receive the content.

In some implementations, the application layer information may identify a delivery type associated with the content. The delivery type may include information that identifies whether the content is streaming content, non-streaming content, etc.

Additionally, or alternatively, the application layer information may identify a file type of the content. The file type may include information that identifies a classification of a file associated with the content. For example, the file may be an image file (e.g., a jpeg), a video file (e.g., a movie), a text file (e.g., a document), or the like.

Additionally, or alternatively, the application layer information may identify an application type associated with the content. The application type may include information that identifies a use associated with the application. For example, a high quality video application may be assigned a different application type than an application that installs updates for a word processor, an e-mail application, etc. As another example, content associated with emergency service related applications or time sensitive transactions may be assigned a different application type than other applications. In some implementations, the application layer information may identify the application instead of the application type.

Additionally, or alternatively, the application layer information may include information that identifies a protocol (e.g., a protocol identifier), at the application layer of the OSI model, used by user device 210 when executing an application to receive the content. For example, the protocol identifier may identify that the protocol is Hypertext Transfer Protocol (HTTP), File Transfer Protocol (FTP), Telnet, Simple Mail Transfer Protocol (SMTP), a Voice over Internet Protocol (VoIP), or the like. The protocol identifier may be useful in determining the application type, a delivery type, or other information that is included in the application layer information. Additionally, or alternatively, the protocol identifier may be included separately in the application layer information.

Additionally, or alternatively, the application layer information may include information that identifies a subscription service associated with the content (e.g., a service identifier). For example, the service identifier may identify a service related to the content (e.g., a music streaming service). If there is no service associated with the content, the service identifier may identify that there is no service associated with the content.

Additionally, or alternatively, the application layer information may include information that identifies a source of the content (e.g., a source identifier). For example, the application layer information may include a source identifier that identifies the source of the content as a website in which a user can download clip art. The source identifier may be a string of characters (e.g., a name), an internet protocol (IP) address, a directory path on user device 210 (e.g., to identify a particular application that is the source), or the like.

Additionally, or alternatively, the application layer information may include information based on other parts of the application layer information (e.g., the application type, the protocol identifier, etc.). For example, the application layer information may include a recommendation (e.g., a request) to use carrier aggregation based on other parts of the application layer information. The recommendation may include information that identifies a recommended classification of a priority for activating carrier aggregation. Carrier aggregation and priority for activating carrier aggregation are discussed in detail below in connection with block 420.

Additionally, or alternatively, the recommendation may be made in the form of an action that indicates a priority for activating carrier aggregation. For example, the action may include adjusting a bit rate associated with the content being sent to base station 220. The bit rate may be used to classify the content as high priority or low priority (e.g., the higher the bit rate, the higher the priority).

In some implementations, base station 220 may identify application layer information for content that user device 210 is requesting. User device 210 may be considered to be requesting content when user device 210 sends a request for the content to base station 220, or when user device 210 is receiving the content and has not sent a command, to base station 220, to no longer receive the content.

In some implementations, the application layer information may be sent to base station 220 from user device 210. For example, user device 210 may identify the application layer information from the application being used and send the information to base station 220. The application layer information may include the recommendation.

In some implementations, the application layer information may be sent to base station 220 from network monitoring device 250 (e.g., via network 260, PGW 240, and SGW 230). For example, network monitoring device 250 may identify the application information based on monitoring network traffic associated with the application that user device 210 is executing. Network monitoring device 250 may in turn send the application layer information to base station 220. The application layer information may include the recommendation.

In some implementations, base station 220 may determine the application layer information. For example, base station 220 may determine the application layer information using deep packet inspection.

As further shown in FIG. 4, process 400 may include determining, for the user device, a priority for activating carrier aggregation based on the application layer information (block 420). For example, base station 220 may determine, for user device 210, a priority for activating carrier aggregation based on the application layer information.

Carrier aggregation may include aggregating multiple carriers (e.g., radio frequency (RF) spectrum bands) to increase a bandwidth and a bit rate between a user device 210 and a network provider. Carrier aggregation may include LAA carrier aggregation, LTE-U carrier aggregation, licensed LTE carrier aggregation, or the like. LTE-U includes using a carrier from an unlicensed RF spectrum band (e.g., RF spectrum bands that have not been licensed and are open for shared use by any device that complies with regulatory agency rules for communicating via the RF spectrum bands, such as the 5 GHz RF spectrum band), and LAA carrier aggregation and Licensed LTE carrier aggregation include using a carrier from the licensed RF spectrum band (e.g., RF spectrum bands that have been licensed from the Federal Communications Commission (FCC), in the United States, by wireless operators, such as the 3.5 gigahertz (GHz) RF spectrum band). Devices that use the unlicensed RF spectrum band may typically have to accept any radio interference caused by other devices that use the unlicensed RF spectrum band.

The priority for activating carrier aggregation may help base station 220 determine when to activate carrier aggregation for user device 210. The priority may be useful to base station 220 because a quantity of carriers for aggregating is limited and activating carrier aggregation may limit the availability of carriers for other communications. Base station 220 may be more likely to activate carrier aggregation for user device 210 when user device 210 has been determined to be a high priority based on application layer information, while base station 220 may be less likely to activate carrier aggregation for a user device 210 when user device 210 has been determined to be a low priority based on application layer information.

In some implementations, base station 220 may determine the priority for activating carrier aggregation based on the application layer information. In some implementations, when the application layer information includes a recommendation and is sent from user device 210 or network monitoring device 250, then base station 220 may base the priority on the recommendation. In some implementations, base station 220 may use the delivery type, the file type, the application, the application type, the source identifier, the protocol identifier, the service identifier, or a combination of these to determine the priority of user device 210 for carrier aggregation. For example, base station 220 may identify the delivery type as streaming, that the file type is a movie, and that the application type is a high-end video streaming application to determine that the content is time sensitive and to determine that user device 210 is a high priority for carrier aggregation.

Additionally, or alternatively, base station 220 may use a bit rate associated with the content to help determine the priority. For example, if the bit rate is low, base station 220 may determine that user device 210 is a low priority for activation of carrier aggregation regardless of the application layer information.

Additionally, or alternatively, base station 220 may use a carrier aggregation capability associated with user device 210 when determining the priority. The carrier aggregation capability may include information associated with an ability of user device 210 to utilize carrier aggregation.

In some implementations, when network monitoring device 250 identifies the application layer information, base station 220 may determine the priority for activating carrier aggregation, for user device 210, by receiving information that identifies the priority from network monitoring device 250. Base station 220 may send network monitoring device 250 information that identifies the carrier aggregation capability of user device 210 prior to receiving the information that identifies the priority. Network monitoring device 250 may use the information that identifies the carrier aggregation capability to help determine the priority for activating carrier aggregation. Once the priority is determined, network monitoring device 250 may send the information that identifies the priority to base station 220 and base station 220 may identify the priority.

Additionally, or alternatively, network monitoring device 250 may control a bit rate in which the content is being sent to base station 220 based on identifying information associated with the application layer information. The bit rate may affect the priority for activating carrier aggregation that base station 220 determines user device 210 should have.

In some implementations, base station 220 may determine priority, for user device 210, to a particular type of carrier (e.g., licensed or unlicensed) based on the application layer information. Base station 220 may compare the application layer information to qualities of a carrier in making this determination. The qualities of the carrier may include the bandwidth, whether the carrier is licensed or unlicensed, an availability of the carrier, or the like. For example, a user device 210 may be given high priority for one type of carrier and be given low priority for another kind of carrier.

In some implementations, base station 220 may associate user device 210 with a queue based on the priority for activating carrier aggregation for user device 210. For example, user devices 210 that are "high priority" for activating carrier aggregation may be associated with a position in a high priority queue. Additionally, or alternatively, the queue may be associated with the priority to a particular type of carrier (e.g., licensed or unlicensed, a carrier of a certain bandwidth, etc.). Additionally, or alternatively, the queue may be associated with a set of criteria that base station 220 may follow before activating carrier aggregation for user device 210. For example, the set of criteria may be to add carriers whenever a carrier is available. As another example, the set of criteria may include a threshold bit rate that needs to be satisfied before adding a carrier, a requirement that base station 220 may only activate carriers that are available, or the like.

As further shown in FIG. 4, process 400 may include activating carrier aggregation for the user device based on determining the priority for activating carrier aggregation (block 430). For example, base station 220 may activate carrier aggregation for user device 210 based on determining the priority for activating carrier aggregation. Base station 220 may activate carrier aggregation to send the content to user device 210 based on the queue and a position in the queue with which user device 210 is associated. Some queues may be assigned a higher priority for carrier aggregation than other queues. Base station 220 may activate carrier aggregation for a first position in a highest priority queue. Base station 220 may determine criteria associated with the queue (e.g., queue is for licensed carriers only) before activating carrier aggregation and activate carrier aggregation based on a carrier satisfying the criteria.

Base station 220 may identify one or more additional carriers to use for carrier aggregation and to use with one or more original carriers. The additional carriers increase a range of frequencies over which the content may be sent and, therefore, provide additional bandwidth.

As further shown in FIG. 4, process 400 may include providing the content to the user device using carrier aggregation based on activating carrier aggregation for the user device (block 440). For example, base station 220 may provide the content to user device 210 using carrier aggregation based on activating carrier aggregation for user device 210. Base station 220 is sending the content using one or more original carriers with one or more additional carriers that were added when carrier aggregation was activated. Base station 220 may continue to use carrier aggregation until user device 210 is no longer receiving the content, until user device 210 requests that base station 220 stop using carrier aggregation, until network monitoring device 250 requests that base station 220 stop using carrier aggregation, or the like.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
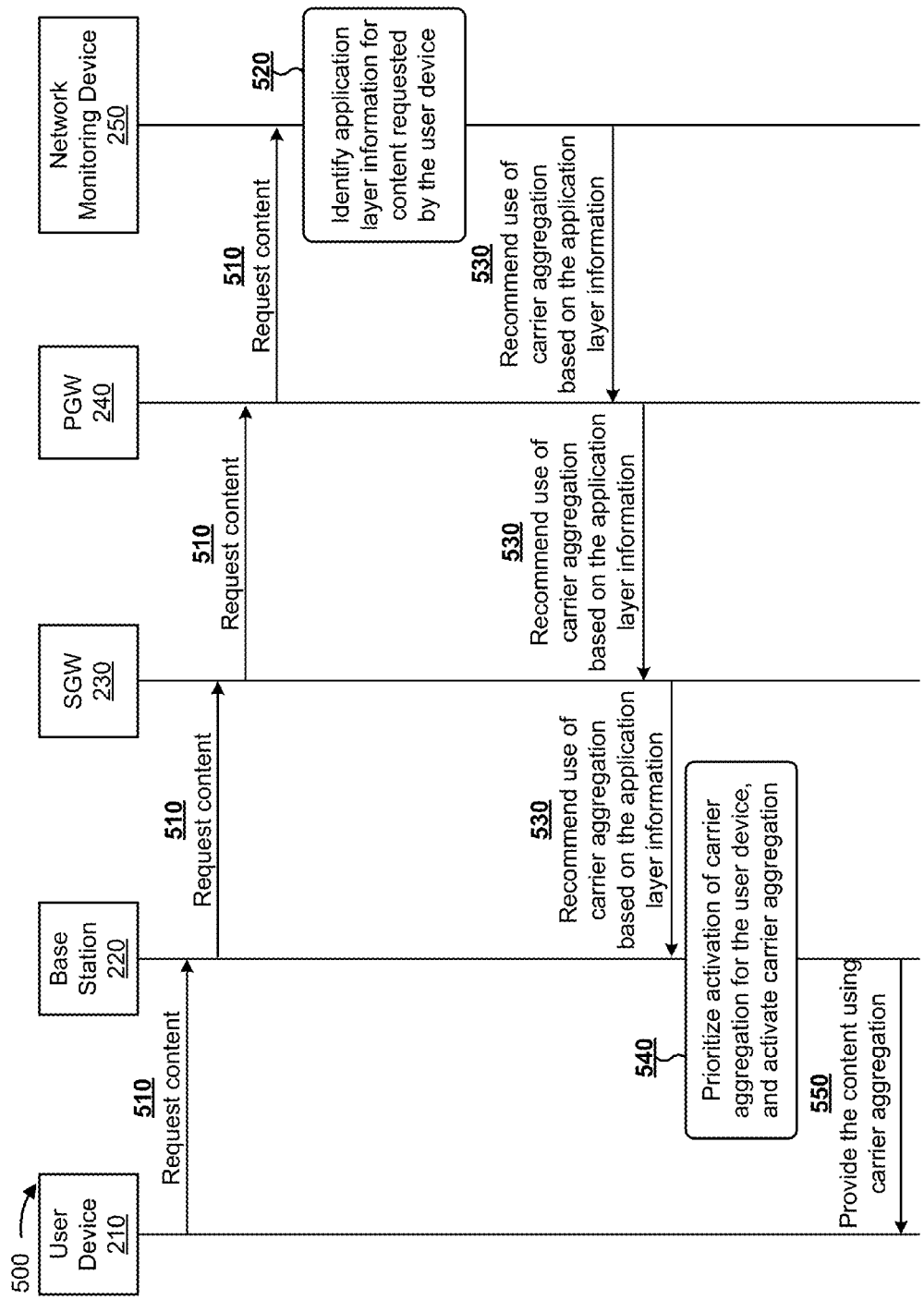
FIG. 5 is a signal diagram of an example implementation relating to the example process shown in FIG. 4.

FIG. 5 is a signal diagram of an example implementation 500 relating to example process 400 shown in FIG. 4. FIG. 5 shows an example of activating carrier aggregation based on application layer information.

As shown in FIG. 5, and by reference number 510, assume that user device 210 requests content via base station 220. Network monitoring device 250 receives the request for content via base station 220, SGW 230, and PGW 240. A device from which user device 210 is requesting the content (e.g., a content provider device) may also receive the request for content via base station 220, SGW 230, PGW 240, and/or network monitoring device 250. In this case, user device 210 may begin to receive the content from the content provider device via network monitoring device 250, PGW 240, SGW 230, and/or base station 220. As shown by reference number 520, network monitoring device 250 identifies the application layer information for the content requested by user device 210. As shown by reference number 530, network monitoring device 250 recommends use of carrier aggregation based on the application layer information. This recommendation is provided to base station 220 via PGW 240 and/or SGW 230. As shown by reference number 540, base station 220 prioritizes activation of carrier aggregation for user device 210 and activates carrier aggregation for user device 210 based on the prioritization. As shown by reference number 550, base station 220 provides the content to user device 210 using carrier aggregation.

As indicated above, FIG. 5 is provided merely as an example. Other examples are possible and may differ from what was described with regard to FIG. 5.

Implementations described herein may determine and use application layer information associated with content that is requested by user device 210 when determining whether to activate carrier aggregation for user device 210. Base station 220 may use the application layer information when prioritizing activation of carrier aggregation, so that carriers are aggregated for content that is a higher priority. By activating carrier aggregation based on application layer information, a network provider is able to save network resources when more bandwidth is not needed (e.g., for a particular application or a protocol) and can reduce costs associated with using carrier aggregation. Furthermore, the network provider provides a better experience to the users associated with user devices 210 of a network by activating carrier aggregation for user devices 210 that could use more bandwidth (e.g., because of an application type or a delivery type).

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more processors to:
identify application layer information for content to be provided to a user device,
the application layer information including information that identifies a file type associated with the content;
determine, for the user device, a priority for activating carrier aggregation based on the application layer information,
the one or more processors, when determining the priority for activating carrier aggregation, being to:
determine the priority for activating carrier aggregation based on the file type;
activate carrier aggregation for the user device based on the priority for activating carrier aggregation; and
provide the content to the user device using the carrier aggregation based on activating the carrier aggregation for the user device.

2. The device of claim 1, where the application layer information further includes information that identifies at least one of:
a delivery type associated with the content;
an application type used to request the content;
an application used to request the content;
a source of the content;
a subscription service associated with the content;
a protocol associated with the content; or
a recommendation to activate carrier aggregation for the content.

3. The device of claim 1, where the one or more processors, when identifying the application layer information, are to:
receive, from the user device or another device, the application layer information.

4. The device of claim 1,
where the application layer information further includes information that identifies a recommendation to activate carrier aggregation; and
where the one or more processors, when determining the priority for activating carrier aggregation, are to:

determine the priority for activating carrier aggregation based on the recommendation.

5. The device of claim 1,
where the application layer information further includes information that identifies a delivery type associated with the content; and
where the one or more processors, when determining the priority for activating carrier aggregation, are to:
determine the priority for activating carrier aggregation based on the delivery type.

6. The device of claim 1,
where the application information further includes an indication of whether the content is time sensitive, and
where the one or more processors, when determining the priority for activating the carrier aggregation, are to:
determine the priority for activating carrier aggregation based on the indication of whether the content is time sensitive.

7. The device of claim 1,
where the application information further includes an indication of whether the content requires additional bandwidth, and
where the one or more instructions, that cause the one or more processors to determine the priority for activating carrier aggregation, cause the one or more processors to:
determine the priority for activating carrier aggregation based on the indication of whether the content requires additional bandwidth.

8. A non-transitory computer-readable medium storing instructions, the instructions comprising:
one or more instructions that, when executed by one or more processors, cause the one or more processors to:
identify application layer information for content to be provided to a user device,
the application layer information identifying a source of the content;
determine, for the user device, a priority for activating carrier aggregation based on the application layer information,
where the one or more instructions, that cause the one or more processors to determine the priority for activating carrier aggregation, cause the one or more processors to:
determine the priority for activating carrier aggregation based on the source of the content;
selectively activate carrier aggregation for the user device based on the priority for activating carrier aggregation; and
provide the content to the user device using the carrier aggregation when the carrier aggregation is activated for the user device, or
provide the content to the user device without using the carrier aggregation when the carrier aggregation is not activated for the user device.

9. The non-transitory computer-readable medium of claim 8, where the one or more instructions, that cause the one or more processors to identify the application layer information, cause the one or more processors to:
receive, from a device that is different from the user device, the application layer information.

10. The non-transitory computer-readable medium of claim 9, where the one or more instructions, that cause the one or more processors to determine the priority for activating carrier aggregation, cause the one or more processors to:
receive the content from the device at a bit rate that the device set based on a carrier aggregation capability of the user device and the application layer information; and
determine the priority based on the bit rate.

11. The non-transitory computer-readable medium of claim 8, where the one or more instructions, that cause the one or more processors to identify the application layer information, cause the one or more processors to:
identify the application layer information based on a recommendation for carrier aggregation,
the recommendation for carrier aggregation being based on at least one of:
a delivery type associated with the content;
a file type associated with the content;
an application type used to request the content;
an application used to request the content;
a subscription service associated with the content;
the source of the content; or
a protocol associated with the content.

12. The non-transitory computer-readable medium of claim 8,
where the application layer information includes an application type used to request the content; and
where the one or more instructions, that cause the one or more processors to determine the priority for activating carrier aggregation, cause the one or more processors to:
determine the priority for activating carrier aggregation based on the application type used to request the content.

13. The non-transitory computer-readable medium of claim 8,
where the application information further includes an indication of whether the content is time sensitive, and
where the one or more instructions, that cause the one or more processors to determine the priority for activating carrier aggregation, cause the one or more processors to:
determine the priority for activating carrier aggregation based on the indication of whether the content is time sensitive.

14. The non-transitory computer-readable medium of claim 8,
where the application information further includes an indication of whether the content requires additional bandwidth, and
where the one or more instructions, that cause the one or more processors to determine the priority for activating carrier aggregation, cause the one or more processors to:
determine the priority for activating carrier aggregation based on the indication of whether the content requires additional bandwidth.

15. A method, comprising:
determining, by a device, application layer information for content requested by a user device,
the application layer information including information that identifies
a protocol associated with the content, and
the protocol associated with the content being used at an application layer;
determining, by the device and for the user device, a priority for activating carrier aggregation based on the application layer information,
determining the priority for activating carrier aggregation including:

determining the priority for activating carrier aggregation based on the protocol associated with the content;

selectively activating, by the device, carrier aggregation for the user device based on the priority for activating carrier aggregation; and providing, by the device, the content to the user device using the carrier aggregation when the carrier aggregation is activated for the user device.

16. The method of claim 15, where determining the application layer information comprises:

receiving, from the user device, the application layer information.

17. The method of claim 15, where determining the application layer information comprises:

receiving, from a network device other than the user device, the application layer information.

18. The method of claim 15, where determining the application layer information comprises:

determining, by the device, the application layer information based on inspecting a packet associated with the content.

19. The method of claim 15, where the application layer information further includes information that identifies an application type used to request the content; and where determining the priority for activating carrier aggregation comprises:

determining the priority for activating carrier aggregation based on the application type used to request the content.

20. The method of claim 15, where the application information further includes information that identifies one or more of:

a delivery type associated with the content, a file type associated with the content, or an application type used to request the content.

\* \* \* \* \*